Aug. 9, 1927.

R. MARSLAND 1,638,639

TURBINE BLADING

Filed Sept. 18, 1923

R. Marsland
INVENTOR

BY
ATTORNEY

Patented Aug. 9, 1927.

1,638,639

UNITED STATES PATENT OFFICE.

ROLAND MARSLAND, OF ESSINGTON, PENNSYLVANIA, ASSIGNOR TO WESTINGHOUSE ELECTRIC AND MANUFACTURING COMPANY, A CORPORATION OF PENNSYLVANIA.

TURBINE BLADING.

Application filed September 18, 1923. Serial No. 663,435.

My invention relates to turbine blading and it has for its object to provide fastenings or root connections therefor which are suitable for securing blades of the larger type to a rotor.

A further object of my invention is to provide a rotor having a plurality of circumferential grooves for blades, each of which is provided with a plurality of root portions for securement in the grooves so that the stresses may be distributed and so that blades of more than average width or mass may be firmly and safely attached to a rotor.

It is common practice to secure a row of turbine blades in a single groove. However, the strength of such a fastening is limited by the allowable stresses in the material of the rotor constituting the side walls of the rotor groove. Such a fastening is unsuitable for blades having unusual width and mass such as met with in the multiple exhaust type of blading shown, described and claimed in the patent to Baumann, reissued April 26, 1921, No. 15,092, for the reason that the side walls of a wide groove for blading of this type would be stressed beyond the allowable limit. It has been proposed to secure blading of this type to a rotor by having the root portions of the blades each provided with a plurality of tongues which fit circumferential grooves in a rotor, pins being used to secure the tongues in the grooves. The strength of this connection is limited by the shearing of the pins. It is the object of my invention to provide a rotor fastening for blading of this type which shall involve relatively lower and better distributed stresses both in the blade root portions and in the material of the rotor which cooperates with the root portions to hold the blades in place. To this end, I provide a rotor or disc with a plurality of undercut grooves and each blade with a plurality of root portions having shoulders which fit the undercut portions of the grooves, wedges being inserted in the grooves to hold the root portions in place.

Figure 1:
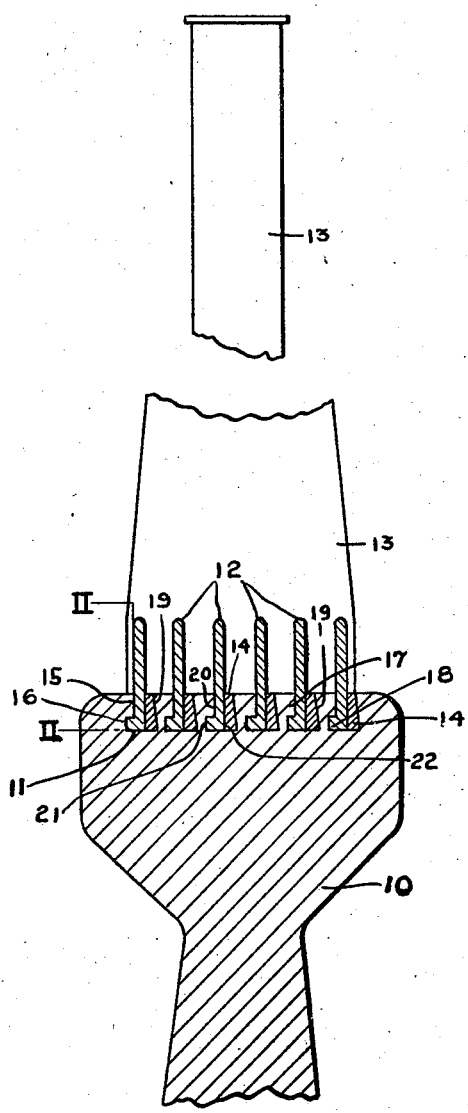
Figure 3:
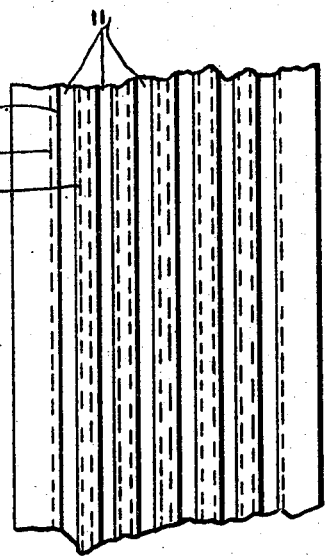
Figure 2:
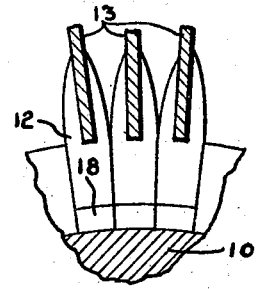

Apparatus made in accordance with my invention is illustrated in the accompanying drawing, forming a part of this application, in which Fig. 1 is a fragmentary sectional view showing my improved turbine blade fastening; Fig. 2 is a section taken along the line II—II of Fig. 1, and Fig. 3 is a fragmentary view of a portion of the rotor or disc having grooves made in acordance with my invention.

Referring now to the drawing for a better understanding of my invention, I show a turbine disc or rotor 10, which is provided with a plurality of circumferential undercut slots or grooves 11 for the reception of a plurality of root portions 12 carried by each of the blades 13. Wedges 14 are arranged in the grooves 11 to hold the root portions in place.

Each undercut groove in the rotor has one side constituted by radial portions 15 and 16, the portion 16 being off-set with respect to the portion 15 so as to provide a groove which is wide at the bottom and a shoulder 17 for cooperation with the top faces of the shoulders 18 provided on the root portions 12. The other wall 19 of each groove is inclined inwardly.

The root portions 12 are provided with off-set lateral faces 20 and 21 which fit against the off-set radial faces 15 and 16, respectively, and define the shoulder 18 which fits the shoulder 17. The opposite straight face 22 of each root portion is opposed to the inclined grooved wall 19 and the wedges 14 are interposed between the walls 19 and the root faces 22 in order to hold the root portions in place.

The maximum width of the bottom of each root portion is less than the minimum width of the top of each slot so that the shoulder portions of the roots may be inserted in the slots 11 as far as possible and then the blade moved longitudinally so that the shoulder portions 18 of the root portions may be brought into cooperation with the shoulders 17 of the grooves and the faces 20 and 21 of the root portions in contact with the radial faces 15 and 16 of the grooves. After a blade is inserted in this manner, wedges 14 are driven in behind the root portions 12 in order to hold the latter in place.

While I have particularly described a plurality of L-shaped root portions for each blade which fit L-shaped slots in a rotor or disc, it is to be understood that, in so far as my invention is concerned, any type of root connection and slot may be used so long as portions of the roots and of the rotor are brought into direct cooperation to hold the blades in place.

From the foregoing, it will be apparent that I have devised a form of blade fastening which is suitable for securing unusually wide or massive blades in place while at the same time preserving low stress values for the fastenings.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a turbine, the combination of a rotor having a plurality of circumferential grooves which are L-shaped in cross section and blades each of which is provided with a plurality of L-shaped root portions fitting in the grooves.

2. In a turbine, the combination of a rotor having a plurality of circumferential grooves, each of the grooves having an undercut side and an inclined side, blades provided respectively with a plurality of root portions which fit the undercut sides of said grooves, and wedge means fitting between the inclined sides of said grooves and said root portions.

3. In a turbine, the combination of a rotor having a plurality of L-shaped slots and blades, each of which has a plurality of L-shaped root portions fitting in the slots.

4. In a turbine, the combination of a rotor having a plurality of circumferential L-shaped slots and blades, each of which has a plurality of L-shaped root portions fitting in the slots, the maximum width of the root portions being less than the minimum width of said slots.

5. In a turbine, the combination of a rotor having a plurality of undercut slots and a plurality of blades, each of which has a plurality of root portions provided with shoulders which fit in the undercut portions of said slots.

6. In a turbine, the combination of a rotor having a plurality of undercut slots, blades having root portions arranged in said slots and provided with shoulders which fit in the undercut portions thereof, and wedge means in the slots for holding the shoulders in the undercut portions of said slots.

7. In a turbine, the combination of a rotor having a plurality of circumferential slots provided with undercut and inclined side walls, blades having root portions provided with shoulders cooperating with the undercut walls, and wedge means interposed between the inclined walls and said root portions.

8. In a rotor having a plurality of circumferential grooves, each of which is constituted by a side wall having off-set portions arranged in radial planes and opposed walls which are inclined and diverge inwardly from said radial plane walls, blades having root portions provided with sides formed to fit the grooved sides arranged in off-set radial planes, and wedge means interposed between the root portions and the inclined walls of said grooves.

In testimony whereof, I have hereunto subscribed my name this 12th day of Sept., 1923.

ROLAND MARSLAND.